United States Patent
McGibney et al.

(10) Patent No.: US 12,013,975 B2
(45) Date of Patent: Jun. 18, 2024

(54) SECURE COMPUTING

(71) Applicant: 2209337 Alberta Inc., Calgary (CA)

(72) Inventors: Grant McGibney, Calgary (CA); George Squires, Foothills (CA)

(73) Assignee: 2209337 Alberta Inc., Calgary (CA)

( * ) Notice: Subject to any disclaimer, the term of this patent is extended or adjusted under 35 U.S.C. 154(b) by 0 days.

(21) Appl. No.: 17/247,717

(22) Filed: Dec. 21, 2020

(65) Prior Publication Data

US 2021/0192088 A1 Jun. 24, 2021

Related U.S. Application Data

(63) Continuation of application No. PCT/CA2020/051752, filed on Dec. 18, 2020.

(60) Provisional application No. 62/951,043, filed on Dec. 20, 2019.

(51) Int. Cl.
| | |
|---|---|
| *G06F 21/74* | (2013.01) |
| *G06F 21/31* | (2013.01) |
| *G06F 21/60* | (2013.01) |
| *G06F 21/79* | (2013.01) |
| *G06F 21/84* | (2013.01) |

(52) U.S. Cl.
CPC ............. *G06F 21/74* (2013.01); *G06F 21/31* (2013.01); *G06F 21/602* (2013.01); *G06F 21/79* (2013.01); *G06F 21/84* (2013.01); *G06F 2221/032* (2013.01); *G06F 2221/2113* (2013.01)

(58) Field of Classification Search
CPC ........ G06F 21/74; G06F 21/31; G06F 21/602; G06F 2221/2113
See application file for complete search history.

(56) References Cited

U.S. PATENT DOCUMENTS

| | | | |
|---|---|---|---|
| 7,725,558 B2 | 5/2010 | Dickenson | |
| 8,646,108 B2 | 4/2014 | Shiakallis et al. | |
| 2016/0292460 A1* | 10/2016 | Boysen | G06F 21/602 |
| 2017/0237747 A1* | 8/2017 | Quinn | G06F 21/602 |
| | | | 726/29 |
| 2018/0198786 A1* | 7/2018 | Shah | H04W 12/069 |
| 2020/0285778 A1* | 9/2020 | Soffer | G06F 1/1639 |

FOREIGN PATENT DOCUMENTS

WO   WO 2019/092729 A1   5/2019

OTHER PUBLICATIONS

International Searching Authority, International Search Report and Written Opinion received for International Application No. PCT/CA2020/051752, dated Feb. 24, 2021, 13 pages, Canadian Intellectual Property Office, CA.

* cited by examiner

*Primary Examiner* — Ellen Tran

(74) *Attorney, Agent, or Firm* — Alston & Bird LLP

(57) ABSTRACT

A secure computer is disclosed comprising a general-purpose domain, a secure domain, and a security module. The general-purpose domain is configured to provide general-purpose computing and comprises a host processor, a non-volatile storage system, and at least one networking device. The secure domain is configured to provide secure computing and comprises a secure processor. The security module is configured to facilitate data transmission between the general-purpose domain and the secure domain.

20 Claims, 9 Drawing Sheets

SECURE COMPUTING

CROSS-REFERENCE TO RELATED APPLICATIONS

This application is a continuation of International Application No. PCT/CA2020/051752 filed Dec. 18, 2020, which claims priority to and the benefit of U.S. Provisional Application No. 62/951,043 filed Dec. 20, 2019, each of which is incorporated herein by reference in its entirety.

FIELD

The present invention relates to computers and specifically to a system and method for facilitating secure computing thereon.

BACKGROUND

Network-connected computers are difficult to keep secure. There are several reasons for this. For example, modern computers rely on their operating systems to keep the data within the computer safe. These operating systems are very complex pieces of software containing millions of lines of code. Such a large volume of code may have unintentional security leaks or extensions that intentionally break the security mechanisms. Alternatively, simpler, system-specific operating systems may not have the sophistication necessary to prevent or inhibit malicious attacks.

As another example, many computer users do not have the training, experience, or time to set up and maintain a secure computer properly. Accordingly, even if a computer is well secured when it is set up, the way it is used may make it less secure. Users may use a work computer for non-work-related activities, such as browsing the web, playing games, reading email, using social media, and the like that expose the computer and its data to security breaches. Even worse, users may disable security features in order to make it easier to access these activities.

Another security issue is the use of poor procedures to grant a remote computer access to a secure network. Typical techniques such as username and password combinations are not very secure. The password may be transferred to the user via an unsecure method like email, or the user may be tricked into giving the password to a third party by a misleading message or phishing scam.

Accordingly, it is an object of the present invention to obviate or mitigate at least some of the above-mentioned disadvantages.

SUMMARY

A computer is described that has two distinct hardware domains. A general-purpose domain is provided for a general-purpose host computer. A secure domain is provided for secure computing. The hardware in the secure domain is secure by design and does not depend on the security of the underlying operating system and software applications, or the skill of the operator and network administrators.

Thus, in accordance with an aspect of an embodiment, there is provided a secure computer comprising: a general-purpose domain configured to provide general-purpose computing, the general-purpose domain comprising: a host processor, a non-volatile storage system, and at least one networking device; a secure domain configured to provide secure computing, the secure domain comprising: a secure processor, and a security module configured to facilitate data transmission between the general-purpose domain and the secure domain. The security module comprises: key storage for storing at least one network encryption key; network identification (ID) storage for storing a network identifier; and a network encryption module configured to encrypt data communicated from the secure domain to the general-purpose domain and decrypt data communicated from the general-purpose domain to the secure domain using the at least one network encryption key.

In an embodiment, the key storage further stores at least one data encryption key. The security module further comprises a storage encryption module configured to encrypt data communicated from the secure domain to the general-purpose domain and decrypt data communicated from the general-purpose domain to the secure domain using the at least one network encryption key. The at least one network encryption key is used to encrypt and decrypt data communicated with the at least one networking device. The at least one storage encryption key is used to encrypt and decrypt data communicated with the non-volatile storage system.

BRIEF DESCRIPTION OF THE DRAWINGS

Embodiments of the inventions will be described by way of example only with reference to the following drawings in which.

DETAILED DESCRIPTION OF THE PREFERRED EMBODIMENTS

Figure 1:
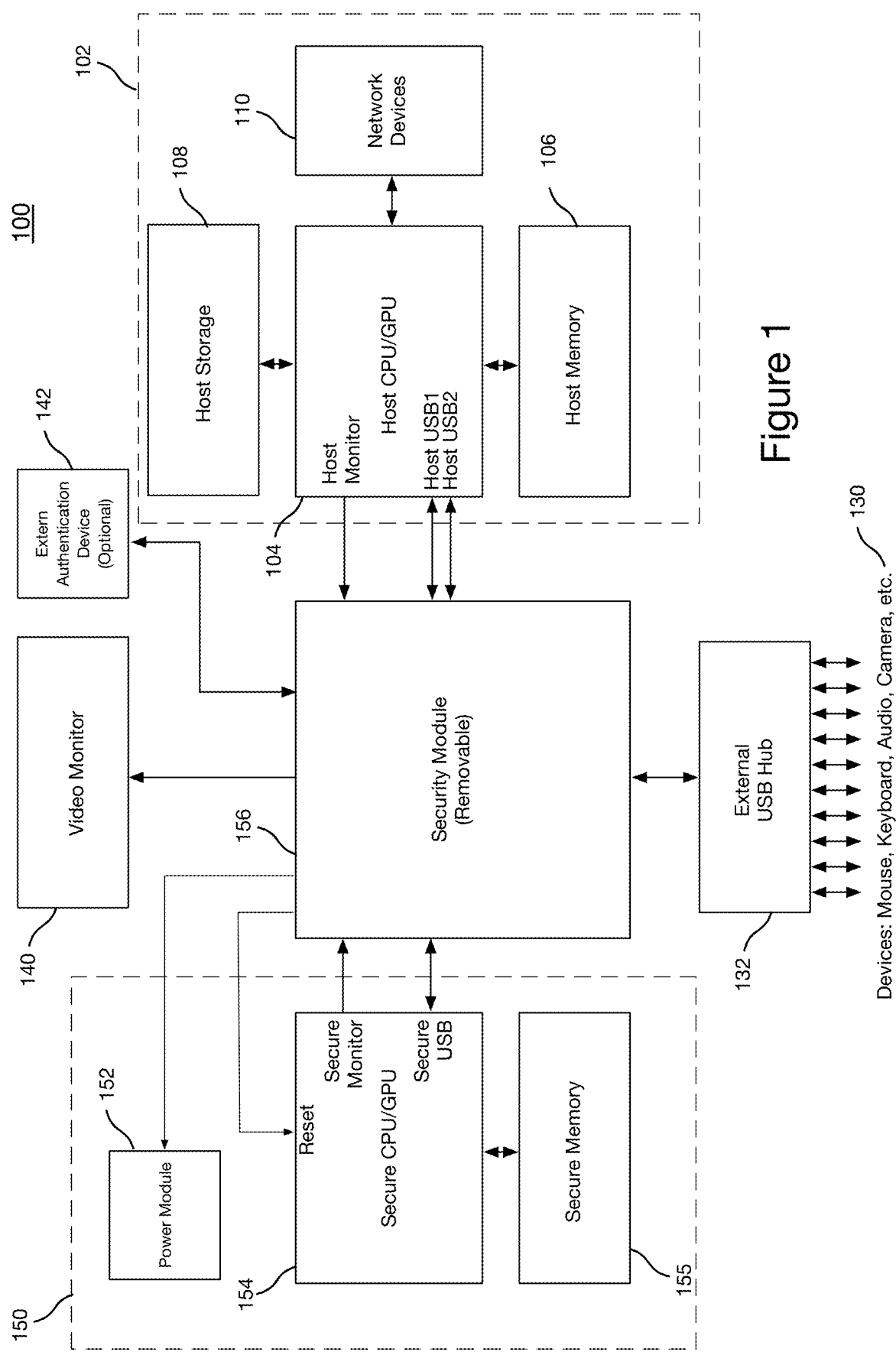
FIG. 1 is a block diagram of a secure computer in accordance with an embodiment.

For convenience, like numerals refer to like structures in the drawings. Referring to FIG. 1, an example of a secure computer in accordance with an embodiment of the invention is illustrated generally by numeral 100. The secure computer system 100 comprises two distinct hardware domains. Specifically, a general-purpose domain 102 is provided for general-purpose computing. A secure domain 150 is provided for secure computing.

The two-domain system allows the computer to work in a way that people typically use a computer. That is, the general-purpose domain 102 provides users with an opportunity to perform non-secure operations, such as web browsing, games, movies, social media, and the like. The secure domain 150 facilitates operations that require access to secure information and private networks. The secure domain 150 is isolated from public networks by hardware interfaces, as will be described. The general-purpose domain 102 and the secure domain 150 do not share data. Thus, the likelihood of the non-secure operations performed by the general-purpose domain 102 affecting the secure domain 150 is greatly inhibited.

The secure domain 150 includes a power control module 152, a secure processor 154, and secure volatile memory 155. The power control module 152 allows the secure domain 150 to be powered down. Powering down may reduce power consumption by the secure computer 100 when the secure domain 150 is not being used. Powering down also clears the secure volatile memory 155 when the secure domain 150 is not in use.

The general-purpose domain 102 includes a host processor 104, host memory 106, a non-volatile storage system 108, and one or more networking devices 110. The non-volatile storage system 108 includes storage devices such as a hard disk drive, a solid-state drive, or the like. The one or more networking devices include WiFi, Ethernet, Bluetooth, cellular technologies, and the like.

The secure domain 150 and the general-purpose domain 102 communicate with each other via a security module 156. Peripheral devices 130 connect to the security module 156, which controls the flow of peripheral information. In an embodiment, the peripheral devices 130 communicate with a peripheral hub 132. The peripheral hub 132 is in communication with the security module 156. Other devices that may be connected to the security module 156 include a video monitor 140 and an external authentication device 142.

The secure domain 150 and general-purpose domain 102 operate independently of each other, and each have their own operating system. While the operating systems provide some level of security for both sides, the security module 156 is designed to provide the secure domain 150 with protection that is difficult, if not impossible, to be overridden by a software program, including the operating system, or misuse by the user of the secure computer 100.

Figure 2:
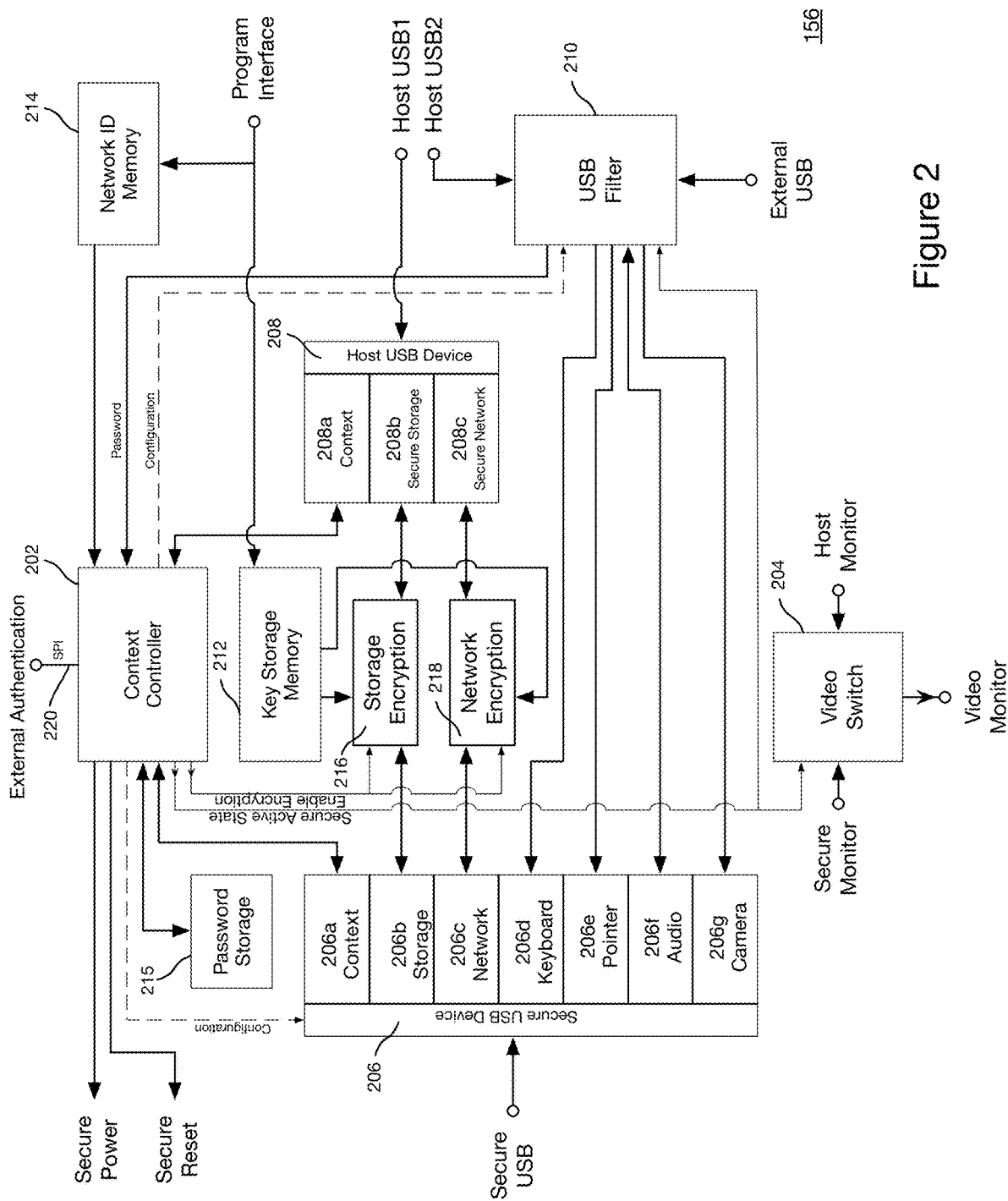
FIG. 2 is a block diagram of a security module of the secure computer.

Referring to FIG. 2 the security module 156 is illustrated in greater detail. The security module 156 includes a context controller 202, a video switch 204, a secure peripheral device 206 interface, a host peripheral device interface 208, a peripheral device filter 210, key storage 212, network identification (ID) storage 214, password storage 215, a storage encryption module 216, a network encryption module 218, and an authentication device interface 220.

Figure 9:
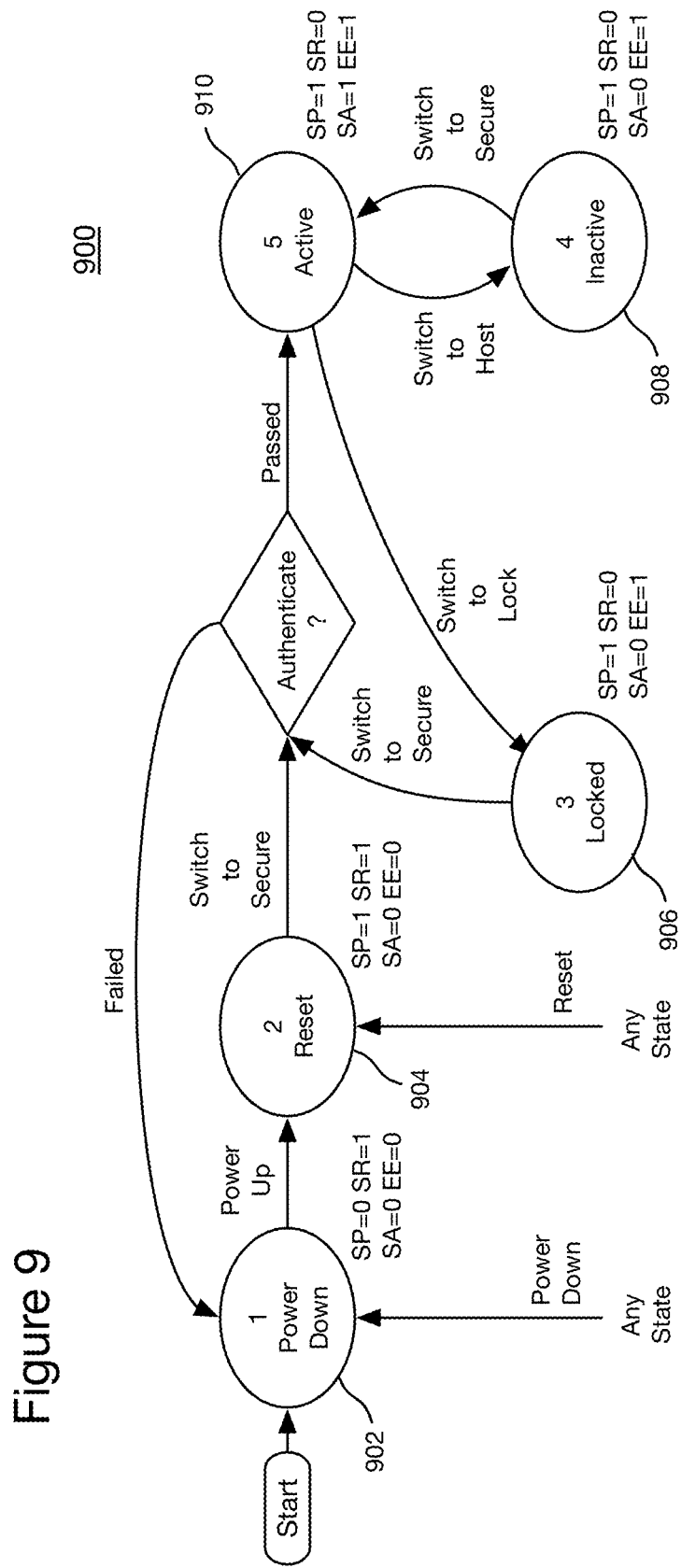
FIG. 9 as a state diagram for a context controller of the security module.

The context controller 202 controls the state of the security module 156. The context controller 202 is accessible from the secure domain 150 via the secure peripheral device 206 and from the general-purpose domain 102 via the host peripheral device 208. The context controller 202 can set the security module 156 into one of five states. Referring to FIG. 9, a state diagram for the context controller is illustrated generally by numeral 900. In a first state 902, the secure domain 150 is powered down and locked. In a second state 904, the secure domain 150 is powered up but locked and in reset. In a third state 906, the secure domain 150 is powered up and running but inactive and locked. In a fourth state 908, the secure domain 150 powered up and unlocked but inactive. In a fifth state 910, the secure domain 150 is powered up, unlocked and active. The context controller 202 receives requests to change the state from both the secure domain 150 via the secure peripheral device 206 and from the general-purpose domain 102 via the host peripheral device 208. In order to transition from a locked state (any of the first to third states 902 to 906) to an unlocked state (either the fourth state 908 or the fifth state 910), authentication will be required. The authentication will be described in detail later in the description. The context controller 202 also configures the secure peripheral device interface 206 and the peripheral device filter 210, as will be described later.

The context controller 202 also sets the state of the video switch 204 to determine which domain has control of the monitor. When the secure domain 150 is active, the video switch 204 routes a video signal from the secure domain 150 to the monitor. Otherwise, the video switch 204 routes a video signal from the general-purpose domain 102 to the monitor.

The secure peripheral device 206 provides outside interface paths with the secure domain 150. In an embodiment, the secure peripheral device interface 206 is a composite device with several interface components, including a context controller interface 206a, a storage device interface 206b, a network device interface 206c, a keyboard interface 206d, a pointer interface 206e, an audio device interface 206f, and a video device interface 206g. Accordingly, the only devices that the secure domain 150 will have access to are the context controller 202, a storage device, a network device, a keyboard, a pointer, an audio device, and a video device.

The host peripheral device interface 208 provides an interface between the secure domain 150 and the general-purpose domain 102. Similar to the secure peripheral device interface 206, the host peripheral device interface 208 is a composite device with several interface components, including a context controller interface 208a, a secure storage interface 208b, and a secure network interface 208c. A first device driver USB1 on the general-purpose domain 102 is coupled with the host peripheral device interface 208 to provide the necessary support for storage and networking, as will be described.

The context controller 202 further sets the state of the peripheral device filter 210 to determine to which domain to send signals coming from the external peripheral devices 130. When the secure domain 150 is not active, the peripheral device filter 210 does not do anything to the signals passing through it. That is, signals coming from the peripheral hub 132 are passed directly a second peripheral driver USB2 on the general-purpose domain 102. When the secure domain 150 is active, the peripheral device filter 210 blocks keyboard, pointer, microphone, and videos signals from going to the general-purpose domain 102 and reroutes the data to the interface components 208a to 208f presented by the secure peripheral device interface 206. The peripheral device filter 210 also combines output sound from both the general-purpose domain 102 and the secure domain 150 to a sound output endpoint, if it exists.

The key storage 212 stores security keys for the secure computer 100. In the present embodiment, there are two security keys: a network security key; and a storage security key. As will be described, the key storage 212 is configured to receive the two security keys via an application program interface (API). However, the API cannot read the keys from the key storage 202. In one example, the key storage 212 comprises a non-volatile programmable memory structure that can only be written to once. In another example, the key storage 212 comprises a volatile memory structure and a battery, which is used to hold the information.

The network ID storage 214 stores a network ID represented by a serial number. In an example, the serial number is a 64-bit serial number. The network ID storage 214 is also programmed by the API. The network ID storage 214 may be a dedicated memory, or it can be a memory that is shared with other components of the security module 156. Unlike the key storage 212, the network ID can be read from the network ID storage 214 via the context controller 202.

The password storage 215 stores authentication type, password length, and password for the authentication module. The password storage 215 comprises a non-volatile programmable memory structure which may or may not be re-writable. Alternatively, the password storage 215 comprises a volatile memory structure and a battery used to hold the information. The password storage 215 can be a stand-alone memory or it can be one a memory shared by other components of the security module 156.

The storage encryption module 216 facilitates communication of secure storage data between the secure domain 150 and the general-purpose domain 102. This allows the secure domain 150 to use the non-volatile storage system 108. Storage data packets pass between the secure peripheral device interface 206 and the host peripheral device interface 208 via the storage encryption module 216. This ensures that all outgoing storage data packets are encrypted, and all incoming storage data packets are decrypted and checked before being passed on. The keys for encryption and decryption are supplied by the key storage 212 via internal signals on the chip that cannot be probed. The storage encryption module 216 will only operate when enabled by the context controller 202. Accordingly, when the storage encryption module 216 is disabled, the secure domain 150 is isolated from the non-volatile storage system 108.

Similarly, the network encryption module 218 facilitates communication of secure network data between the secure domain 150 and the general-purpose domain 102. This allows the secure domain 150 to communicate with remote computers. Network data packets pass between the secure peripheral device interface 206 and the host peripheral device interface 208 via the network encryption module 218. This ensures that all outgoing network data packets are encrypted, and all incoming network data packets are decrypted and checked before being passed on. The keys for encryption and decryption are supplied by the key storage 212 via internal signals on the chip that cannot be probed. The network encryption module 218 will only operate when enabled by the context controller 202. Accordingly, when the network encryption module 218 is disabled, the secure domain 150 is isolated from remote computers.

The context controller 202 is configured to inhibit a malicious change of context state by the host. Accordingly, the context controller 202 limits access to the unlocked security states. In an embodiment, four different types of authentication utilized, so the password storage 215 only needs a 2-bit authentication type field to represent all four authentication types. As an example, the storage used for the password length is 6 bits and for password the itself is 63 bytes. The password is programmed into the password storage 215 via the context controller 202 and the secure peripheral device interface 206 and cannot be read back. If the password storage 215 is re-writable, the password can only be changed to a new password with a command to the context controller 220 that includes the current password.

A first authentication type, or secure system type, is represented by "00" in the authentication type field. The secure system type may be used when the secure computer 100 is physically located in a secure location, such as behind firewalls in a secure room. Alternatively, the secure system type can be used when the secure operating system of the secure computer 100 provides adequate authentication. When the authentication type field is set to the secure system type the context controller 202 will enable a change to the secure state when requested, without any additional hardware authentication.

A second authentication type, or a password protected type, is represented by "01" in the authentication type field. The password protected type may be used when the secure computer 100 is physically located outside of a secure location. When the authentication type field is set to the password protected type, upon receipt of a request to change to the secure state, the context controller 202 will configure the peripheral device filter 210 to pass all keyboard input to the context controller 202 and block the keyboard input from the general-purpose domain 102. The context controller 202 will only complete the change to the secure state if it receives an input password at the keyboard that matches the password in the password storage 215.

A third authentication type, or an external device protected type, is represented by "10" in the authentication type field. Similar to the password protected type, the external device protected type may be used when the secure computer 100 is physically located outside of a secure location. When the authentication type field is set to the external device protected type, upon receipt of a request to change to the secure state, the context controller 202 will request authentication from an external authentication device via the authentication device interface 220. In an embodiment, the authentication device interface is a serial peripheral interface (SPI). The external authentication device may include a biometric scanner or other advanced authentication scheme as desired. The external authentication device is configured to communicate the password to the context controller 202 using the SPI 220 upon authentication of the user. The context controller 202 will only complete the change to the secure state if it receives an input password via the SPI 220 that matches the password in the password storage 215.

A fourth authentication type, or set password type, is represented by "11" in the authentication type field. The set password type indicates that the password has not yet been programmed, and authentication will always return true. Accordingly, this will prompt drivers on the secure system to request the user set the password. Once the password is set, the authentication type field is set to the password protected type and is represented by "00", "01", or "10" in the authentication type field.

Figure 3:
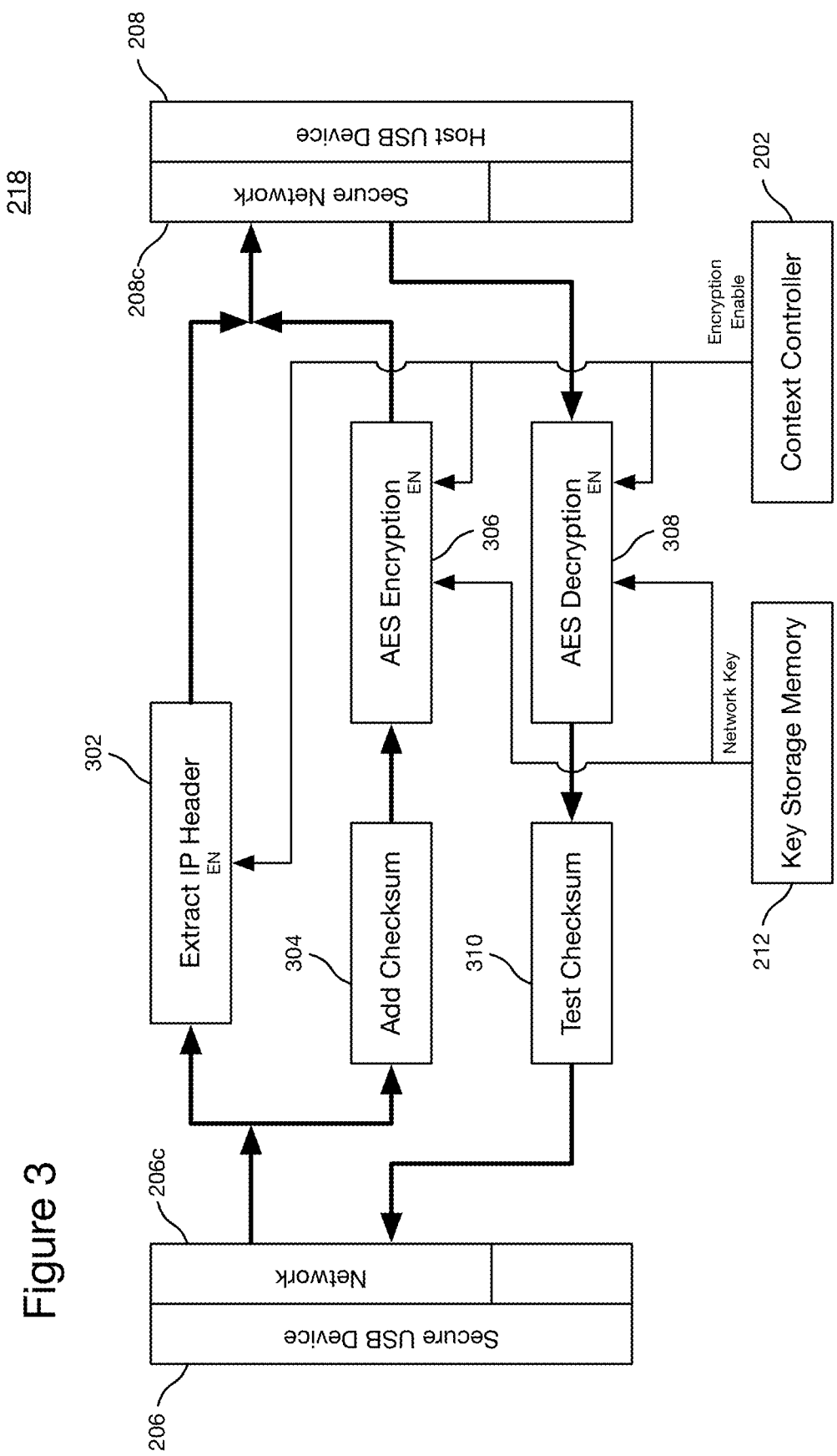
FIG. 3 is a block diagram of a network encryption module of the security module.

Referring to FIG. 3, the network encryption module 218 is illustrated in greater detail. The network encryption module 218 includes a header extractor 302, a checksum generator 304, network data encryption unit 306, a network data decryption unit 308, and a checksum tester 310. When the secure domain 150 wants to send a data packet to a remote location, it sends the data packet to the network device interface 206c on the secure peripheral device interface 206, which communicates the data packet to the network encryption module 218. The header extractor 302 extracts the header from the data packet. The checksum generator generates a checksum. The checksum is created using a hashing algorithm. In the present embodiment, the MD5 message-digest algorithm is used and the checksum is a 128-bit MD5 message digest of the payload. The network data encryption unit 306 encrypts both the checksum and the payload. In the present embodiment, a 256-bit AES encryption algorithm provides the encryption using the network security key from the key storage 212. When disabled by the context controller 202, the header extractor 302, network encryption unit 306, and the network decryption unit 308 will not forward any data.

The encrypted data and a copy of the unencrypted header are sent to the secure network interface 208c on the host peripheral device interface 208. The host peripheral device interface 208 communicates the packet to the peripheral driver USB1 running on the general-purpose domain 102. When the peripheral driver USB1 receives the network packet, it examines the header to determine which destination machine in its table is to receive the packet. As will be described, the secure domain 150 is constrained to communicate only with a small number of machines on the public network that contain matched security modules 156 that can be used to decode the IP packets. The peripheral driver USB1 then sends a User Datagram Protocol (UDP) packet to the destination machine with the network ID and the encrypted packet as its payload.

The peripheral driver USB1 keeps an open UDP port for receiving secure packets from other devices. In an embodiment, secure packets are identified based on the port at which they are received. When a secure packet is received, it is passed on to the network encryption module 218 via the network interface 208c on the host peripheral device interface 208. The network encryption module 218 receives the packet and the network data decryption unit 308 decrypts the packet using the network security key from the key storage 212. The checksum tester 310 regenerates the MD5 message digest from the payload and compares it to the checksum in the decrypted message. Since the checksum is based on the unencrypted data, only another computer with a matching network security key will be able to generate a checksum that matches the MD5 digest after decryption. If the MD5 message digest and the checksum match, then the packet is verified. Once the packet is verified, it is communicated to the secure domain 150 via the network device interface 206c on the secure peripheral device interface 206. If the MD5 message digest and the checksum do not match, then the packet is discarded.

Figure 4:
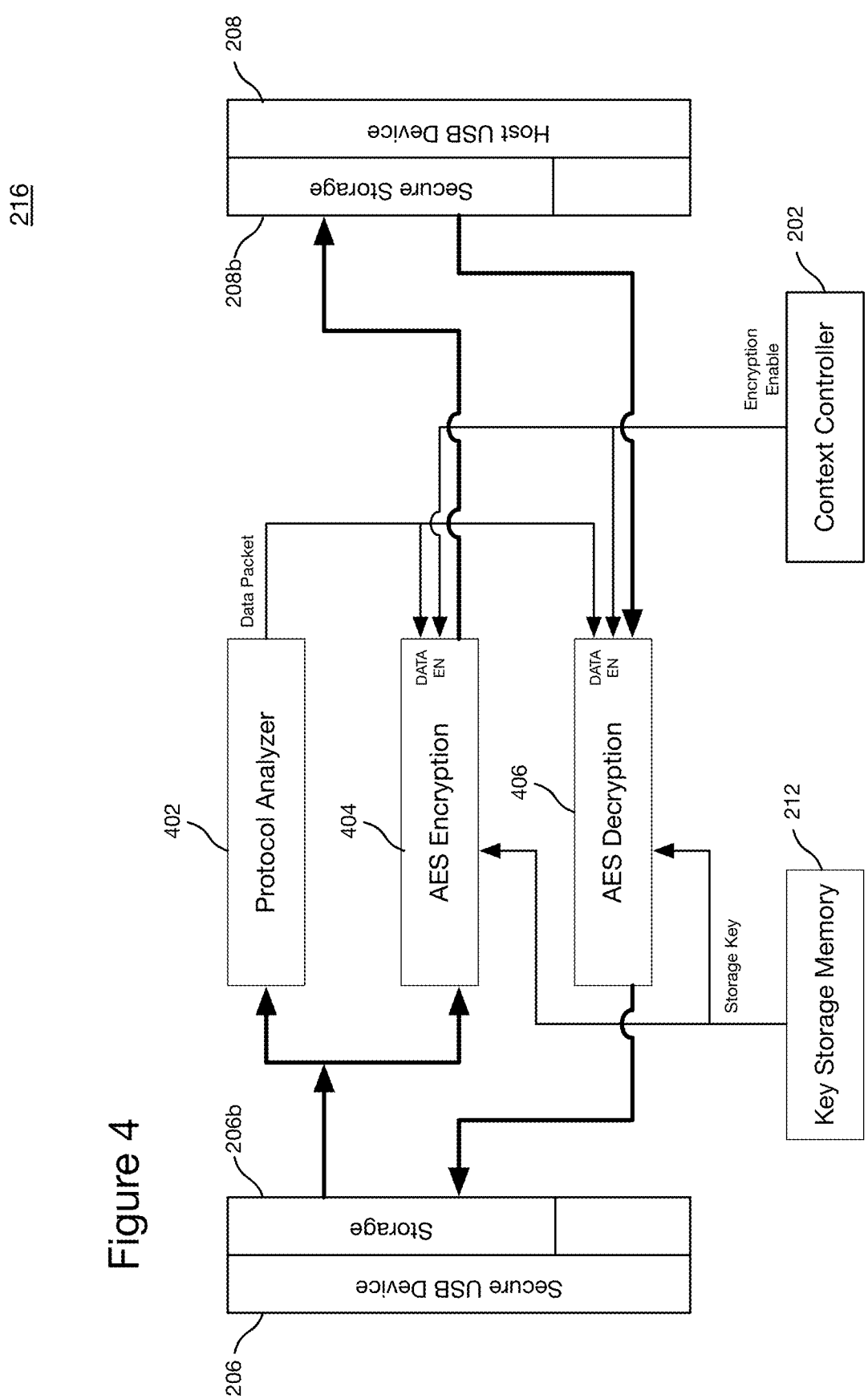
FIG. 4 is a block diagram of a storage encryption module of the security module.

Referring to FIG. 4, the storage encryption module 216 is illustrated in greater detail. The storage encryption module 216 comprises a protocol analyzer 402, a storage encryption unit 404, and a storage decryption unit 406. The storage device interface 206b on the secure peripheral device interface 206 presents a standard peripheral mass storage class device to the secure domain 150. When the secure processor 154 wants to access storage, it sends commands to the storage device interface 206b, which in turns communicates the commands to the storage encryption module 216. The commands are processed by the protocol analyzer 402, where they are decoded to determine whether encryption is required. If the command contains storage data, then the data is encrypted by the storage encryption unit 404. Specifically, the storage encryption unit 404 uses the storage security key from the key storage 212 for encryption. In an embodiment, the data is encrypted using an AES-256 encryption algorithm. Encrypted data is passed to the secure storage interface 208b of the host peripheral device interface 208. Other messages such as command block wrappers are not encrypted as they do not contain user data. Such messages are passed to the secure storage interface 208b in plain text. As noted above, the storage encryption module 216 will only operate when enabled by the context controller 202. Accordingly, when the storage encryption module 216 is disabled, the storage encryption unit 404 and storage decryption unit 406 modules will not forward any data.

The secure storage interface 208b communicates the received storage commands to the first peripheral driver USB1. The first peripheral driver USB1 is configured to open a file on the non-volatile storage system 108 that will act as a virtual disk for the secure domain 150. The first peripheral driver USB1 receives commands from the secure storage interface 208b and performs the corresponding disk action on the virtual disk. Even though the user data is stored in the general-purpose domain 102, all user data is encrypted. Thus, the host processor 104 will not be able to access any user data from the secure domain 150.

Data read from the virtual disk passes from the first peripheral driver USB1 to the secure storage interface 208b and then to the storage encryption module 216. The read data is processed by the protocol analyzer 402 to determine if the read data includes user data. If the read data does include user data, the user data is decrypted by the storage decryption unit 406. Specifically, the storage decryption unit 406 uses the storage security key from the key storage 212 for decryption. In an embodiment, the data is decrypted using an AES-256 encryption algorithm. Decrypted data is passed to the storage interface 206b of the secure peripheral device interface 206. Other messages such as commands are not decrypted as they do not contain user data. Such messages are passed to the storage interface 206b in plain text.

Unlike network packet communication, there is no hardware checking the read data. If the read data were not written by the storage encryption module, they will come back scrambled and the secure processor 154 will likely be able to detect a corrupted file system. As will be described, since only the security module 156 has access to the storage encryption key, any data written to the secure disk file must come through the secure domain 150.

Figure 5:
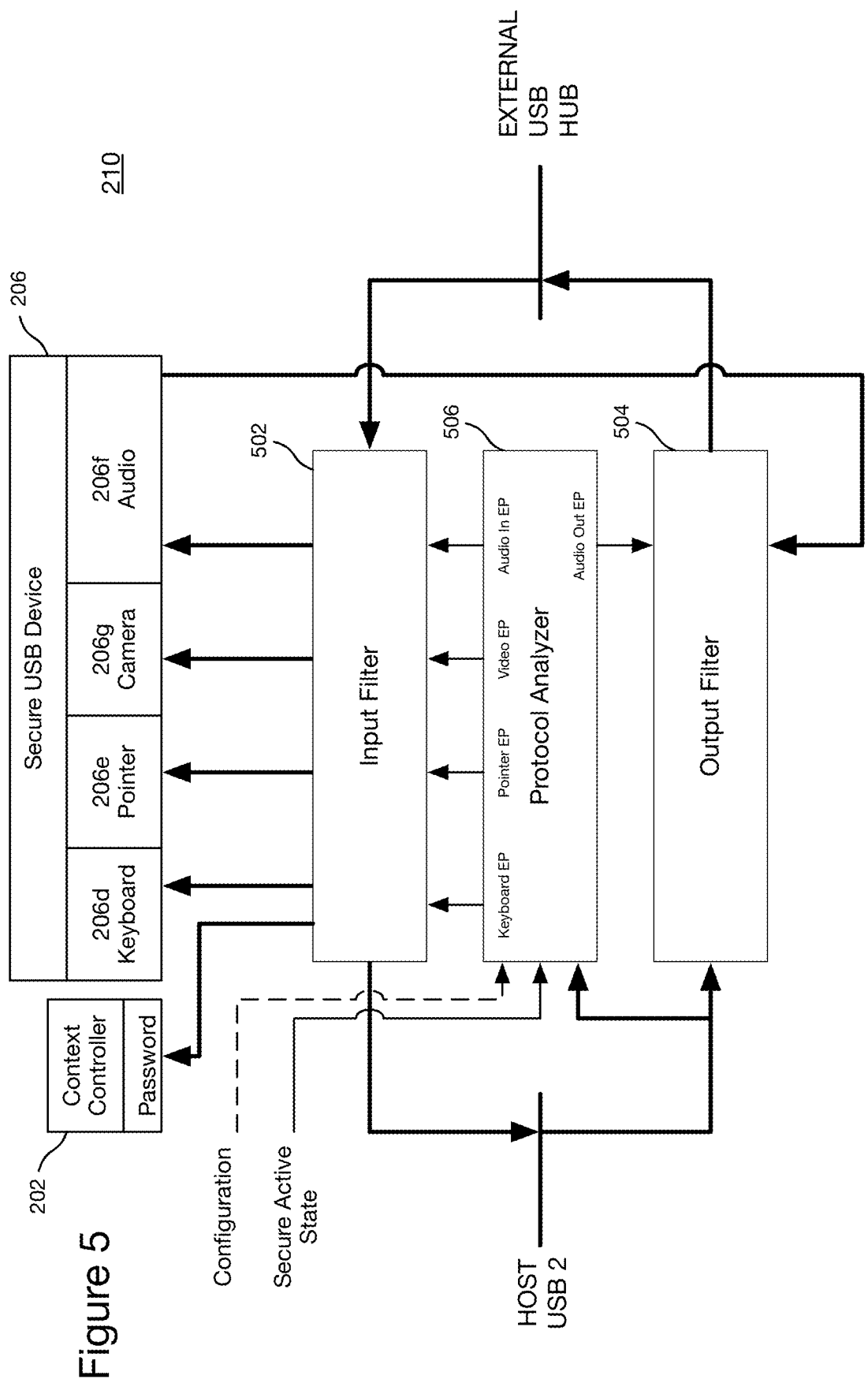
FIG. 5 is a block diagram of a peripheral device filter of the security module.

Referring to FIG. 5, the peripheral device filter 210 is illustrated in greater detail. The peripheral device filter 210 comprises a peripheral device input filter 502, a peripheral device output filter 504, and a peripheral protocol analyzer 506. All of the peripheral devices plugged into the system are connected to the peripheral hub 132 and controlled from the general-purpose domain 102. That is, the general-purpose domain 102 enumerates the peripheral devices and runs the peripheral bus signaling. After enumerating a peripheral device such as a keyboard, pointing device, audio, or video, for example, the general-purpose domain 102 configures the peripheral filter 210 to look for data for these devices on particular device/endpoint combinations.

When the secure state is inactive, the peripheral protocol analyzer 506 is inactive and the general-purpose domain has control of the peripherals and monitor output. Accordingly, the peripheral device input filter 502 and the peripheral device output filter 504 do nothing but pass-through peripheral device data. In contrast, when the secure state is active, then the peripheral protocol analyzer 506 is active and the data to and from the peripheral devices 130 is filtered by the peripheral device input filter 502 and the peripheral device output filter 504. Specifically, the peripheral protocol analyzer 506 is configured to monitor for the device/endpoint packets from or to devices used by the secure domain 150.

Thus, in an embodiment in which the secure domain 150 has access to a keyboard, a pointer, a video device, and one or more audio devices, the peripheral protocol analyzer 506 is configured with the device and endpoint information for each of the keyboard, pointer, video device, and audio device. The audio device may be an input audio, for example a microphone, or an output audio device, for example a speaker. For data input from the peripheral device 130, the protocol analyzer configures the peripheral device input filter 502 accordingly. When data is received from the peripheral device, it is filtered by the peripheral device input filter 502 and routed to a corresponding one of the interface components of the secure peripheral device interface 206. Null data is routed to the second peripheral port USB2 so that the general-purpose domain 102 does not interpret the missing data as an error with the peripheral device 130. For data output to the peripheral device 130, the protocol analyzer configures the peripheral device output filter 504 accordingly. When data is sent to the peripheral device 130, it is filtered by the peripheral device output filter 504 and only data from a corresponding one of the interface components of the secure peripheral device interface 206 is sent to the device.

For example, consider a keyboard that sends keystrokes from device 12, endpoint 1. The peripheral protocol analyzer 506 detects when the general-purpose domain requests data from device 12, endpoint 1 and set a "Keyboard EP" flag for the input peripheral filter 502. When the data from the keyboard is received at the peripheral filter 210, the input peripheral input filter 502 reroutes the data to the keyboard interface 206d of the secure peripheral device interface 206. Since it is not desirable to communicate copies of this data to the general-purpose domain 102, the input peripheral filter 502 replaces data received from the keyboard with null information that does not contain any data. This null information satisfies the request for data from the general-purpose domain 102, without jeopardizing the security of the secure domain 150. Similar procedures are run for the pointer, video, and audio input packets.

As noted throughout the specification, the security module 156 includes the storage encryption key and the network encryption key. To facilitate communication between different computers with a secure network, the security module 156 of each computer within the secure network is configured with the same network encryption key and the same network ID. Thus, data encrypted and transmitted from one computer within the secure network can be received and properly decrypted at another computer within the secure network.

Figure 6:
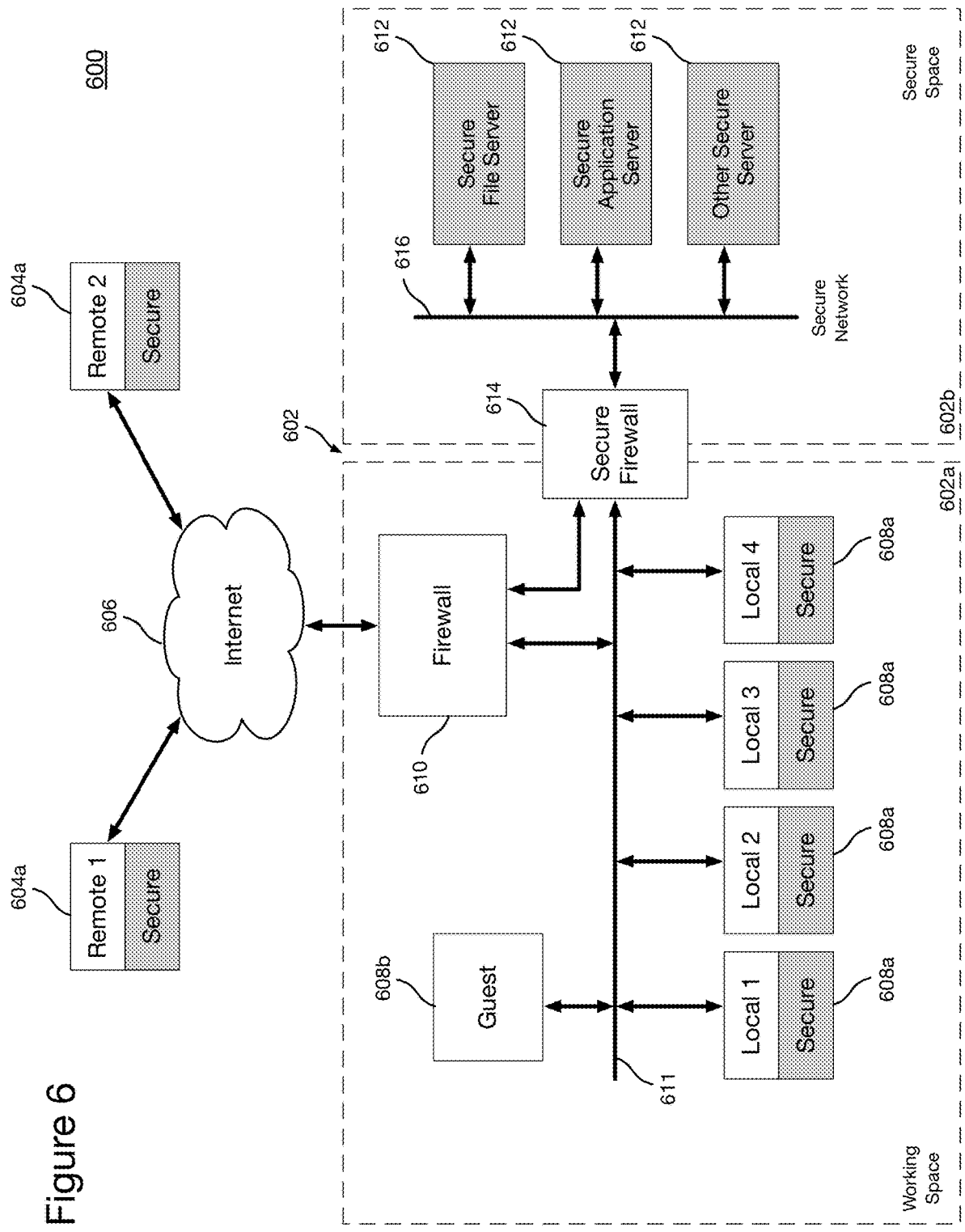
FIG. 6 is a block diagram of a secure network of secure computers.

Referring to FIG. 6, an example of a secure network is illustrated by numeral 600. The network includes a local network 602, a plurality of remote computers 604, and a communication network 606. The local network 602 includes a local working space 602a and a local secure space 602b. The local working space 602a includes a plurality of local computers 608 and a firewall 610. The local secure space 602b includes a plurality of secure servers 612 and a secure firewall 614. The secure servers 612 and the secure firewall 614 are coupled via a secure local area network 616. The local computers 608 may include local secure computers 608a, as described herein, and standard, state of the art computers 608b. Similarly, the remote computers 604 may include remote secure computers 604a, as described herein, and standard, state of the art computers (not shown).

Within the local working space 602a, the local computers 608 are coupled via a local area network 611. For ease of explanation, each of the local secure computers 608a belongs to the same secure network, so each includes a security module 156 configured with the same network encryption key and the same network ID. Thus, data communicated from a secure domain 150 one of the local secure computers 608a can be received and properly decrypted by the secure domain of another one of the local secure computers 608a. Similarly, data communicated from the secure domain of one of the local secure computers 608a can be received and properly decrypted by the secure domain of one of the remote secure computers 604a. Yet further, the secure firewall 614 includes a security module 156 for each corresponding secure network. Thus, the secure domain of each of the local secure computers 608a and the remote secure computers 604a can also communicate with the secure servers 612 via the secure firewall 614. In contrast, the standard local computers 608b and the standard remote computers will not be able to communicate with the secure domain 150 of any of the local or remote secure computers. Further, the standard local computers 608b and the standard remote computers will not be able to communicate with the secure servers 612. Yet further, any external computer that manages to gain access through the firewall 610 will not be able to access to any data in the local secure space 602b or on the secure domains 150 of the secure computers 608a and 604a.

Figure 7:
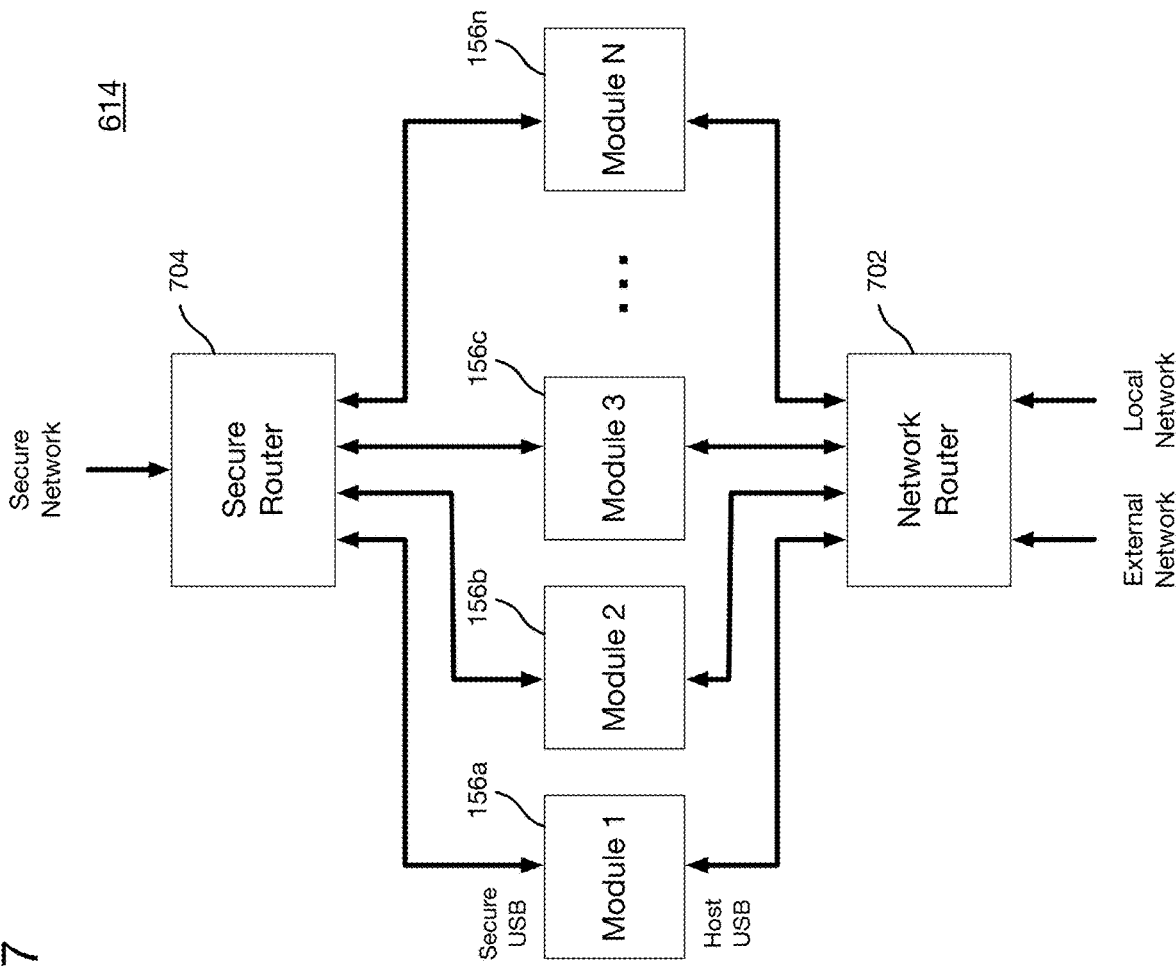
FIG. 7 is a block diagram of a secure firewall of the secure network.

Referring to FIG. 7, the secure firewall 614 is illustrated in greater detail. The secure firewall 614 comprises a network router 702, a plurality of security modules 156a to 156n, and a secure router 704. The network router 702 may be implemented in software on a general-purpose computer and couples the secure firewall 614 with the local area network and the communication network. The network router 702 is also coupled to the plurality of security modules 156a to 156n. The secure router 704 couples the secure firewall 614 with the secure local area network 616. When the network router 702 receives UDP packets that are to be forwarded to the local secure space 602b, it recovers the network ID from the packet and forwards the packet to a corresponding of the corresponding security modules 156a to 156n, if it exists. The selected security module 156 decrypts the packet and confirms the checksum. If the checksum is confirmed, it is communicated from the secure router 704 to the local secure space 602b.

To communicate a packet from the local secure space 602b to one of secure computers 608a or 604a, the local secure server 612 sends a packet to the secure router 704. The packet includes the address of the selected secure computer. The secure router 704 maintains a table correlating the address of the secure computers with their network ID. The security module 156 that has a network ID that matches the network ID of the selected secure computer is identified. The packet is communicated to the identified security module 156, which encrypts the packet and forwards the encrypted packet to the network router 702. The network router checks the address and builds a UDP packet for the secure device with the network number and encrypted packet.

The Basic Input/Output System (BIOS) of the secure domain 150 will initially perform a network boot from a machine in the secure space 602b before installing the operating system, applications, and data files required to run the secure domain 150. Only files fetched from the secure space 602b will be able to be installed in the secure domain 150. The only drivers required for the secure domain are for those devices provide by the secure peripheral device interface 206 of the security module 156. Other drives for the external peripheral devices 130 will be installed on the general-purpose domain 102.

Figure 8:
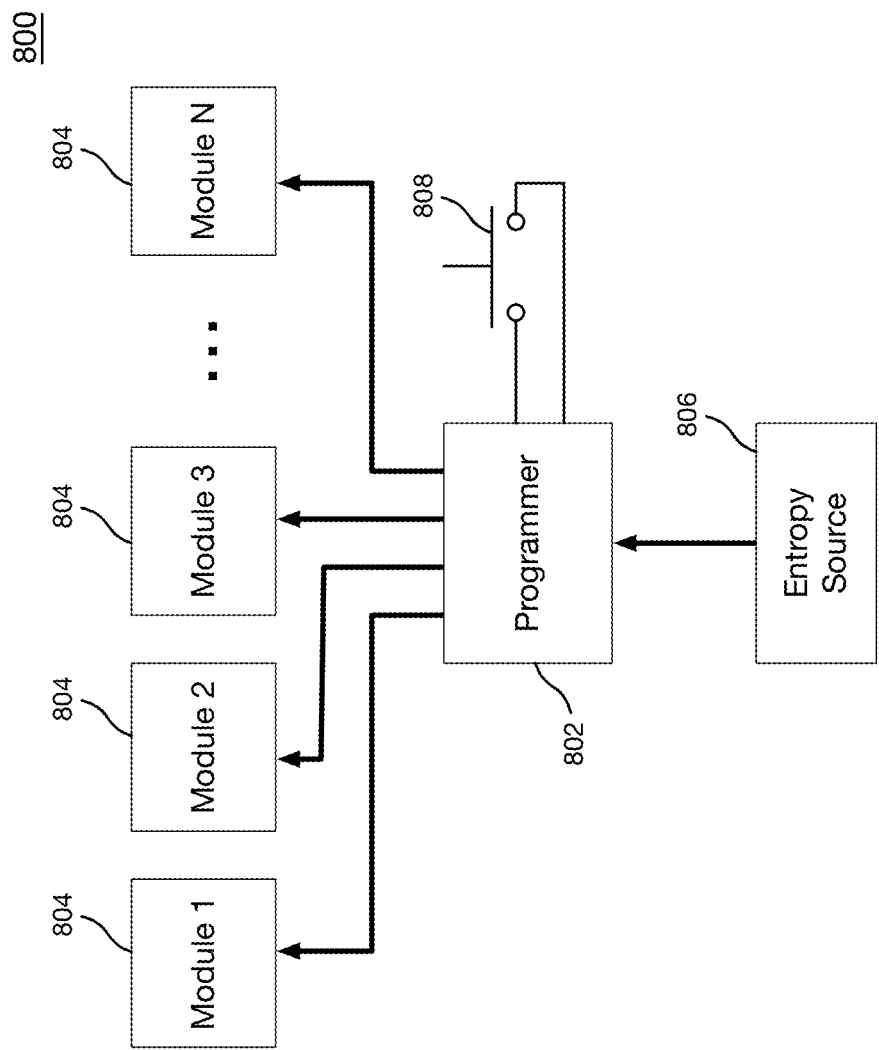
FIG. 8 is a block diagram of a programming device used to program the security module.

Referring to FIG. 8, a programming device used to program the security module 156 is illustrated generally by numeral 800. The programming device 800 is made as simple as possible to minimize the chance of security holes. The programming device 800 comprises a programming unit 802, a plurality of security module interfaces 804, an entropy source 806, and an activation switch 808. The programming unit 802 is coupled with each of the plurality of security module interfaces 804, the entropy source 806, and the activation switch 808. The entropy source 806 can be any device that generates unbiased random numbers that cannot be duplicated, such as a thermal noise source from a resistor, for example. Each of the plurality of security module interfaces 804 comprises a serial peripheral interface (SPI) for coupling to a security module 156. Each of the plurality of security module interfaces 804 also includes a red and green light emitting diode (LED). The programming unit 802 comprises a small microcontroller with a programming application and no permanent storage. The activation switch 808 is coupled with the programming unit 802 to initiate the programming application.

When security modules 156 are plugged into the security module interfaces 804, they are interrogated by the programming unit 802 to determine if they have been programmed. Although the application programming interface of the security module 156 will never reveal the value of the storage security key or the network security key, it will indicate whether the keys have been programmed. If the programming unit 802 determines that the security module 156 is available and not already programmed with keys, it will light the red LED of the associated security module interface 802. When the desired number of security modules 156 have been plugged in and verified, the programming unit 802 is ready to program the security modules 156. In response to a user pressing the activation switch 808, the programming unit 802 generates the network security key, the network ID, and a plurality of storage security keys. The network security key and the network ID will be common to all of the security modules 156a to 156n. The storage security key will be unique to each of the security modules 156a to 156n. The storage security key, the network security key and the network ID are sent to each security module 156 a total of five times. The application programming interface on the program module 156 reviews the storage security key, the network security key and the network ID to make sure that all five received versions are the same. If they are the same, the application program interface programs the storage security key, the network security key and the network ID before sending an acknowledgement to the programming unit 802. The programming unit 802 will then switch the LED from red to green to indicate success. If the storage security key, the network security key and the network ID are not the same, then an acknowledgement is not sent. If the acknowledgement is not received within a predefine time period, the programming unit 802 will retry to program the security modules 156. Once all the security modules 156a to 156n are programmed, the programming unit 802 erases its memory and gets set for the next programming cycle. At this point the only copies of the storage security key, the network security key and the network ID are stored inside the security modules. The storage security key and the network security key cannot be read out.

The above described computer system that provides a general-purpose domain for general-purpose host computer functionality and a secure domain for secure computing. The hardware in the secure domain is secure by design and does not depend on the security of the underlying operating system and software applications, or the skill of the operator and network administrators.

It will be apparent to those skilled in the art that various modifications and variations can be made to the disclosed secure computer without departing from the scope of the disclosure. Other embodiments of the secure computer will be apparent to those skilled in the art from consideration of the specification and implementation of the secure computer in a secure network disclosed herein. For example, although the secure computer is disclosed as switching control of the monitor between the secure domain 150 and the general-purpose domain 102, in an alternative embodiment, a secure window and a general-purpose window are presented on the monitor. When the secure window is active, the secure domain 150 is active. When the general-purpose window is active, the secure domain 150 is inactive.

As another example, although the secure computer is described as using symmetric key cryptography, public-key cryptography can also be used. In such a case, both public encryption keys and private decryption keys are programmed in the key storage 212. However, to enhance security, the public key need not actually be made available to the public.

As yet another example, secure computers in a first secure network can use the secure space 602b to communicate with secure computers in a second secure network. In an embodiment, the secure computers in the first network can transmit data, along with a request to relay that data, to one of the secure servers 612 using the network encryption key associated with the first secure network. The secure firewall 614 decrypts the message and the request and forward them to the appropriate secure server 612. The secure server 612 interprets the request and verifies that the requesting computer has permission to communicate with secure computers in the second secure network. If the user is verified, the secure server 612 communicates the data to the secure firewall 614 to relay to the secure computer in the second secure network. The secure firewall 614 uses the network encryption key associated with the second secure network to encrypt the data. The encrypted data is then relayed to the destination secure computer.

As yet another example, the secure computer may need to pass through a plurality of nested firewalls to reach a highly secure destination. For example, a first layer firewall would be accessible by any member of an organization. A second layer firewall would follow the first layer firewall and would be accessible only to a limited number of people within the organization. A third layer firewall would follow the second layer firewall and would be accessible only to a few of the limited number of people within the organization. To reach the inner, more secure layers, the secure computer requires multiple security modules 156. For example, to reach the most secure, third layer firewall, the secure domain 150 first uses a security module associated with the third layer firewall to encrypt the data. The secure computer then uses a security module associated with the second layer firewall to encrypt the previously encrypted data. Finally, the secure computer then uses a security module associated with the third layer firewall to encrypt the twice previously encrypted data. The triple encrypted data is then passed to the general-purpose domain 102 to be communicated through the network. Once received at the destination, the nested packet works its way through each of the three firewall layers, with each firewall layer removing one of the nested encryption layers until the original, clear data is communicated on the innermost domain. As will be appreciated, data destined for a middle domain need not pass the third layer firewall. Thus, such data only needs to be encrypted twice to pass the first two layers. Similarly, data destined for an outer domain need not pass the second layer firewall or the third layer firewall. Thus, such data only needs to be encrypted one to pass the first layer firewall.

As will be appreciated, at present, the standard for the peripheral devices 130 is Universal Serial Bus (USB). However, other known peripheral bus protocols, such as Inter-Integrated Circuit (I2C), Serial Peripheral Interface (SPI), and other, proprietary, peripheral bus protocols may also be used.

The term computer, as used herein, is intended to have it well-known, broad definition. That is, a machine that can be instructed to carry out sequences of arithmetic or logical operations automatically via programming. As will be appreciated by a person skilled in the art, this definition encompasses personal computing devices such as desktop computers, laptop or notebook computers, smartphones, tablets, and the like. This definition also encompasses smart devices such as security cameras, remote locks, sensors, control systems, and the like, as well as embedded computers.

Although embodiments have been described above with reference to the accompanying drawings, those of skill in the art will appreciate that variations and modifications may be made without departing from the invention as defined by the appended claims.

The invention claimed is:

1. A secure computer comprising:
a general-purpose domain configured to provide general-purpose computing, the general-purpose domain comprising: a host processor, a non-volatile storage system, and at least one networking device;
a secure domain configured to provide secure computing, the secure domain comprising:
a secure processor; and
a security module communicatively coupled to and between the general-purpose domain and the secure domain using a peripheral bus protocol, the security module comprising:
a storage encryption module configured to facilitate secure storage data transmission between the general-purpose domain and the secure domain via the peripheral bus protocol, thereby providing the secure domain with secure access to the non-volatile storage system of the general-purpose domain, wherein the storage encryption module is configured to decrypt all incoming storage data packets and encrypt all outgoing storage data packets that are passed between the general-purpose domain and the secure domain and that are communicated with the non-volatile storage system;
a network encryption module configured to facilitate secure network data transmission between the general-purpose domain and the secure domain via the peripheral bus protocol, thereby providing the secure domain with secure access to the at least one networking device of the general-purpose domain, wherein the network encryption module is configured to decrypt all incoming network data packets and encrypt all outgoing network data packets that are passed between the general-purpose domain and the secure domain and that are communicated with the at least one networking device; and
a context controller configured to enable and disable the storage encryption module and to enable and disable the network encryption module; and
an authentication module configured to authenticate a user of the secure computer before enabling the secure domain.

2. The secure computer of claim 1, wherein the security module further comprising:
a key storage for storing at least one network encryption key;
network identification (ID) storage for storing a network identifier; and
the network encryption module configured to decrypt all the incoming network data packets and encrypt all the outgoing network data packets that are passed between the general-purpose domain and the secure domain using the at least one network encryption key.

3. The secure computer of claim 2, wherein the key storage further stores at least one storage encryption key and the storage encryption module configured to decrypt all the incoming storage data packets and encrypt all the outgoing storage data packets using the at least one network encryption key.

4. The secure computer of claim 1, wherein the security module comprises a video switch to determine which of the general-purpose domain or the secure domain has control over a display.

5. The secure computer of claim 1, wherein the security module further comprises a secure peripheral device interface configured to facilitate communication with the secure domain.

6. The secure computer of claim 5, wherein the security module further comprises a host peripheral device interface configured to facilitate communication with the general-purpose domain.

7. The secure computer of claim 6, wherein the security module further comprises a peripheral device filter configured to route data from system devices to the secure peripheral device interface and block data from the host peripheral device interface when the secure domain is active.

8. The secure computer of claim 1, wherein the network encryption module is only operable when the context controller enables the network encryption module.

9. The secure computer of claim 1, wherein, when the network encryption module is disabled, the secure domain is isolated from one or more remote computers via the at least one networking device.

10. The secure computer of claim 1, wherein the security module further comprises the authentication module.

11. The secure computer of claim 1, wherein the authentication module is configured to provide a different level of authentication based on a preprogrammed authentication type.

12. The secure computer of claim 1, wherein the security module is removable.

13. The secure computer of claim 1, wherein the storage encryption module is only operable when the context controller enables the storage encryption module.

14. The secure computer of claim 1, wherein, when the storage encryption module is disabled, the secure domain is isolated from the non-volatile storage system.

15. The secure computer of claim 1, wherein the network encryption module and the storage encryption module are disabled when the secure domain is inactive.

16. A security module to facilitate secure data transfer in a secure computer communicatively coupled to and between a general-purpose domain and a secure domain using a peripheral bus protocol, the security module comprising:
key storage for storing at least one network encryption key and at least one storage encryption key unique to the security module;
network identification (ID) storage for storing a network identifier;
a network encryption module configured to facilitate secure network data transmission between the general-purpose domain and the secure domain via the peripheral bus protocol, thereby providing the secure domain with secure access to at least one networking device of the general-purpose domain, wherein the network encryption module is configured to use the at least one network encryption key to decrypt all incoming network data packets and encrypt all outgoing network data packets that are passed between the general-purpose domain and the secure domain and that are communicated with the at least one networking device;

a storage encryption module configured to facilitate secure storage data transmission between the general-purpose domain and the secure domain via the peripheral bus protocol, thereby providing the secure domain with secure access to a non-volatile storage system of the general-purpose domain, wherein the storage encryption module is configured to use the at least one storage encryption key to decrypt all incoming storage data packets and encrypt all outgoing storage data packets that are passed between the general-purpose domain and the secure domain and that are communicated with the non-volatile storage system; and a context controller configured to enable and disable the storage encryption module and to enable and disable the network encryption module.

17. The security module of claim 16, wherein the network encryption key and the network identifier are common to the plurality of devices in the network.

18. The security module of claim 16 wherein the local storage device is located in a general-purpose domain of the secure computer.

19. The security module of claim 18, wherein the network encryption key and the storage encryption key are inaccessible to external devices.

20. A programming unit for programming a plurality of security modules according to claim 16, the programming unit comprising:

a plurality of security module interfaces configured to physically couple the programming unit with corresponding ones of the security modules; and computer readable instructions which, when executed by the programming unit, cause the programming unit to:
program each of the security modules with a common network security key;
program each of the security modules with a common network identifier; and
program each of the security modules with at least one storage encryption key that is unique to the security module.

* * * * *